(12) United States Patent
Saddoughi et al.

(10) Patent No.: US 7,387,491 B2
(45) Date of Patent: Jun. 17, 2008

(54) ACTIVE FLOW MODIFICATIONS ON WIND TURBINE BLADES

(75) Inventors: Seyed Gholamali Saddoughi, Clifton Park, NY (US); Anurag Gupta, Clifton Park, NY (US); Philippe Giguere, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 403 days.

(21) Appl. No.: 11/022,900

(22) Filed: Dec. 23, 2004

(65) Prior Publication Data

US 2006/0140760 A1 Jun. 29, 2006

(51) Int. Cl.
*F03D 7/06* (2006.01)

(52) U.S. Cl. ........................................ 416/62; 415/914

(58) Field of Classification Search ................ 415/914, 415/115, 23, 62, 231 R, 231 B; 416/23, 416/62, 231 R, 231 B
See application file for complete search history.

(56) References Cited

U.S. PATENT DOCUMENTS

| | | | |
|---|---|---|---|
| 4,504,192 A * | 3/1985 | Cyrus et al. ................. | 416/41 |
| 5,957,413 A | 9/1999 | Glezer et al. | |
| 5,961,080 A * | 10/1999 | Sinha ......................... | 244/204 |
| 5,983,944 A | 11/1999 | Niv | |
| 6,109,566 A | 8/2000 | Miller et al. | |
| 6,371,414 B1 | 4/2002 | Truax et al. | |
| 6,379,110 B1 | 4/2002 | McCormick et al. | |
| 6,390,418 B1 | 5/2002 | McCormick et al. | |
| 6,412,732 B1 | 7/2002 | Amitay et al. | |
| 6,629,674 B1 | 10/2003 | Saddoughi et al. | |
| 6,644,598 B2 | 11/2003 | Glezer et al. | |
| 6,682,021 B1 | 1/2004 | Truax et al. | |
| 6,722,581 B2 | 4/2004 | Saddoughi | |
| 6,869,049 B2 | 3/2005 | Saddoughi | |
| 7,198,234 B2 | 4/2007 | Saddoughi | |
| 2002/0134891 A1 | 9/2002 | Guillot et al. | |
| 2002/0195526 A1 | 12/2002 | Barrett et al. | |

OTHER PUBLICATIONS

Investigation of Vortex Generator for Augmentation of Wind Turbine Power Performance. Dayton A. Griffin. Dec. 1996 NREL/SR-446-21399.

* cited by examiner

*Primary Examiner*—Edward Look
*Assistant Examiner*—Dwayne J White
(74) *Attorney, Agent, or Firm*—Ann M. Agosti; Patrick K. Patnode

(57) ABSTRACT

A wind turbine blade is situated on a wind turbine and includes a side and a tip. The blade is configured to rotate about an axis upon an impact of a wind flow on the blade. An active flow modification device is disposed on the blade. The active flow modification device is configured to receive active flow instructions and to modify the wind flow proximate to the blade. The resulting wind turbine blade uses these active flow modifications to achieve reduced loads, reduced aerodynamic losses, reduced noise, enhanced energy capture, or combinations thereof.

32 Claims, 5 Drawing Sheets

ACTIVE FLOW MODIFICATIONS ON WIND TURBINE BLADES

BACKGROUND

The invention relates generally to the field of wind turbines, and more specifically to active flow modification in wind turbines for reducing loads, reducing aerodynamic losses, improving energy capture, reducing noise, and combinations thereof.

Wind turbines are increasingly gaining importance in the area of renewable sources of energy generation. In recent times, wind turbine technology has been applied to large-scale power generation applications. Of the many challenges that exist in harnessing wind energy, one is maximizing wind turbine performance while minimizing system loads in given wind conditions. Non-limiting examples of improved wind turbine performance parameters, which lead to minimized cost of energy, include maximized aerodynamic efficiency, maximized energy output, minimized wind turbine system loads, minimized noise, and combinations thereof. Examples of wind turbine system loads include extreme loads (operational and parked/idling) and fatigue loads.

In general, flow separation over wind turbine blades leads to stall, which is often a limiting factor in wind turbine blade design. When stall occurs, lift generated by the blade decreases significantly and a large component of the torque, which is the driving force imparted by the wind to the wind turbine, is lost. Solutions that provide an ability to control (diminish or delay) separation will allow the wind turbine blade to maximize lift. Some passive flow control solutions, for example, vortex generators, have been applied to remedy the boundary layer separation problem, but in such solutions there is no provision to stop the flow control when the flow control becomes unnecessary or undesirable. For example, one of the principal constraints in wind turbine design is that caused by system loads. When a separation control solution is being used to enhance lift, the blade experiences higher loading that can reach failure-inducing levels if the wind conditions change beyond normal operational or expected levels.

One effective approach for increasing the energy output of a wind turbine is to increase the swept area of the blades, for example, by increasing rotor size (diameter). The higher systems loads on a larger rotor (thicker and larger chord length) due to structural and material limitations, and blade/tower clearances typically constrain this growth. Another challenge is posed by changing wind conditions such as wind gusts or storms that lead to an undesired loading of the wind turbine blade as the lift being generated fluctuates or increases to very large levels. These loads constraints often lead to increased cost of the blade and other components of the wind turbine system, which can reduce or cancel the benefits of growing the rotor in terms of a system-level metric like cost of energy.

Another challenge that exists in harnessing wind energy relates to undesirable effects of the tip vortex generated by the wind flow at the tip of the blades. Besides causing energy harnessing losses, these tip vortices also lead to undesirable noise emanating from the tip end of the blade.

BRIEF DESCRIPTION

There exists a need for active separation control methods and systems that provide for an ability to manipulate lift production on demand, and blade design concepts that utilize such an ability to decrease system loads to enable higher performance wind turbines. Such active flow modification methods can additionally or alternatively be utilized for generally making the wind turbine more efficient and less noisy.

Embodiments of the present invention are directed toward improving wind turbine performance by using active flow modification for reducing loads, aerodynamic losses, aerodynamic noise, or combinations thereof.

Several aspects of the invention reside in a wind turbine including a wind turbine blade and the wind turbine blade assembly. In these aspects, a wind turbine blade is configured to rotate about an axis upon impact of a wind flow. Active flow modification devices configured to receive active flow instructions are disposed on the blade, and the active flow modification devices are configured to modify the wind flow proximate to the blade.

Another aspect of the invention resides in a method of operating a wind turbine by obtaining a current state of at least one operating condition of the wind turbine and actively modifying the wind flow proximate to the blade in response to the current state to improve the performance.

Another aspect of the invention is a wind turbine blade design comprising the use of active flow modification devices on the wind turbine blade to reduce loads and enable a larger size of the wind turbine blade than would be within operating specifications without the active flow modification devices. In this application, a wind turbine would produce the required lift or maximized lift for power production with a smaller blade. Under hostile wind conditions, it would be turned off resulting in a reduction of system loads in those conditions. With such a means of addressing system load constraints, the wind turbine rotor can be grown to a larger size resulting in higher energy capture, while operating under the same load limitations as when the blade design does not include the use of a flow separation control system.

Another aspect of the invention is a wind turbine blade design comprising the use of active flow modification devices on a tip of the wind turbine blade to have lower aerodynamic losses and noise than would be within operating specifications without the active flow modification devices.

Another aspect of the invention is a wind turbine blade design that incorporates an active flow modification system that can be used to reduce the undesired loadings, either intermittent or sustained, caused by changing wind conditions (for example, by initiating separation and reducing lift) to provide improved performance.

Another aspect of the invention is a wind turbine blade design that incorporates an active flow modification system that is used to regulate the changes in lift production and resultant power output, either intermittent or sustained, caused by changing wind conditions (for example, by initiating separation and reducing lift if needed or by increasing lift and power when needed by inhibiting separation).

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
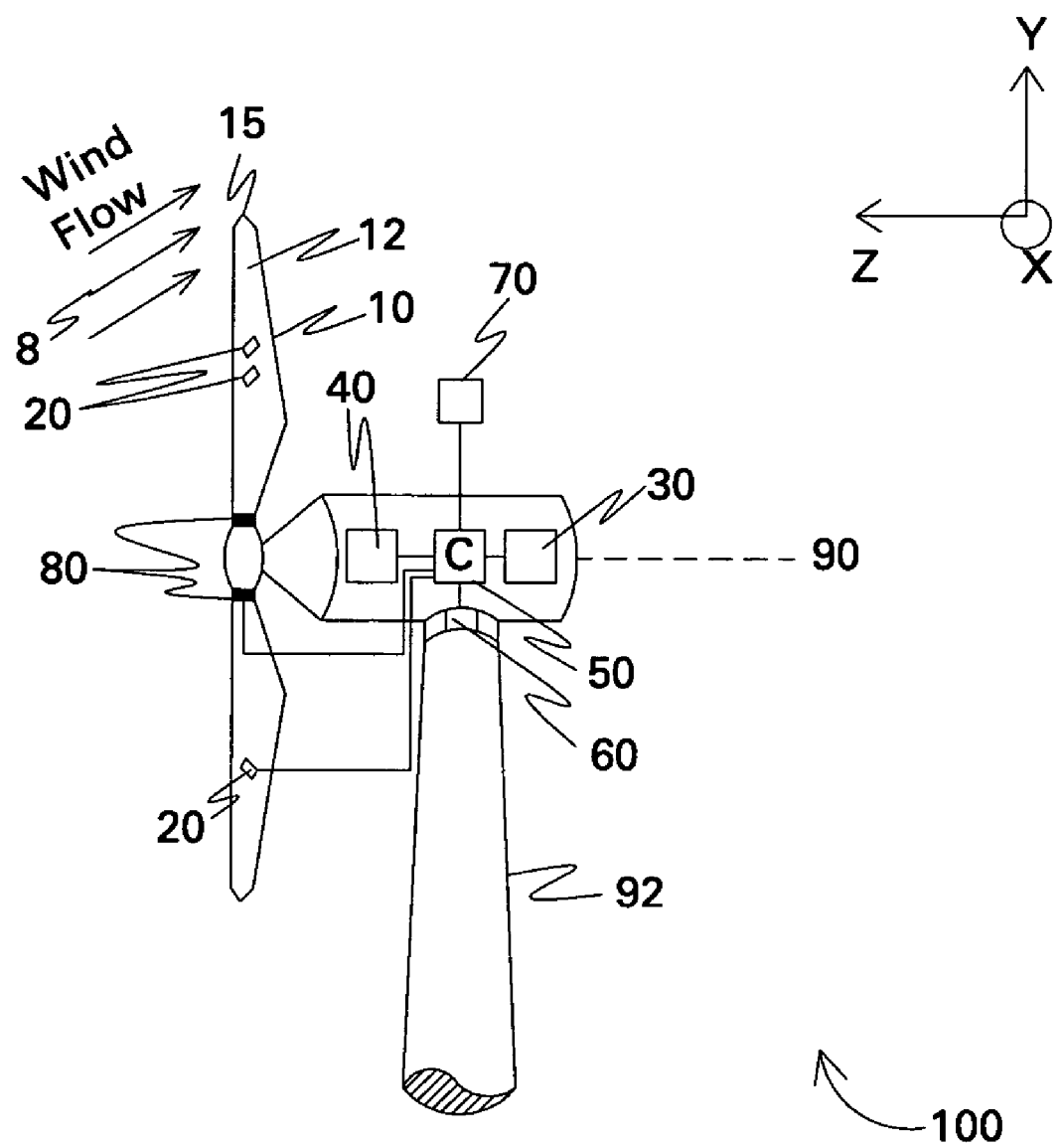
FIG. 1 is a side view schematic of a wind turbine in accordance with one aspect of the invention.

FIG. 1 illustrates a wind turbine 100 in accordance with one embodiment of the present invention. The wind turbine 100 includes a wind turbine blade 10 configured to rotate about an axis 90 upon impact of an incident wind flow, for example, a wind flow 8 as shown. It is appreciated that as used herein, the terms "a", "an" and "the" refer to "at least one" and plural variants thereof, unless otherwise specifically mentioned or indicated by the context. The axis of rotation 90 is along the z-axis in the axes system of FIG. 1, and the plane of rotation of the blades 10 is x-y plane, the x-axis coming out of the plane of the paper. An active flow modification device 20 is further disposed on the blade 10, and the blade and the active flow modification device 20 together form a wind turbine blade assembly 17 (shown in FIG. 2). The active flow modification device 20 is configured to modify the wind flow 8 proximate to the blade, thereby modifying a load on the wind turbine. The term "wind flow proximate to the blade" will be understood as referring to that portion of the wind flow that is proximate to the blades (including blade surface and tip) and not the entire wind flow 8. The wind flow proximate to the blade includes, without limitation, wind flow zones over the blade surface and tip-vortices near a tip end of the blade.

Figure 2:
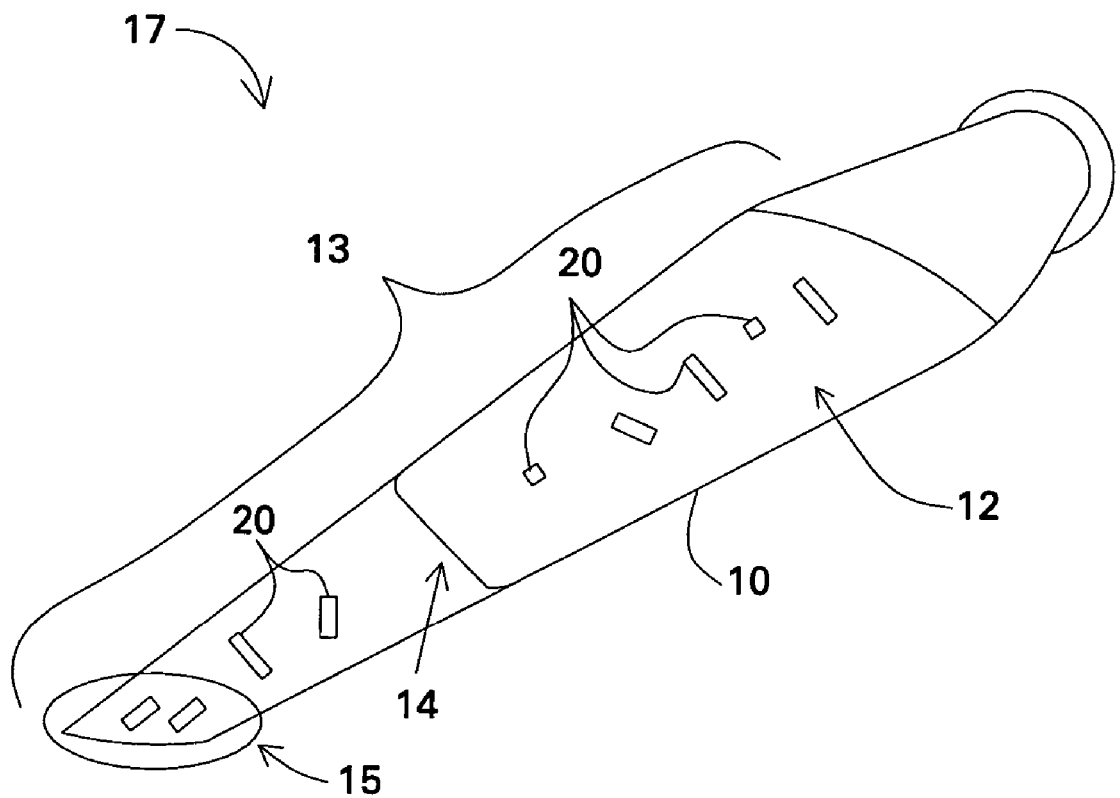
FIG. 2 is a partial perspective view of a wind turbine blade assembly useful in the embodiment of FIG. 1.

FIG. 2 illustrates the wind turbine blade assembly 17 comprising the wind turbine blade 10 and a number of the active flow modification devices 20 disposed in various orientations on the blade 10, according to an aspect of the invention. The blade 10 includes a side 12 and a tip 15, and the active flow modification devices 20 disposable on the blade are optionally disposed at different angles on the side 12 (meaning on at least one side) and the tip 15. The side 12 has a length 13 and a breadth 14 that may vary along the length, and the tip 15 includes the end portion of the blade 10. The active flow modification devices 20 may also be disposed on a second side (not shown in the figure) opposite to the side 12.

The active flow modification devices 20 are typically configured to release, in a time-dependent fashion, jets of desired strengths and at desired frequencies. Non-limiting examples of such devices 20 include piezoelectric synthetic jets or zero-mass actuators, other synthetic jet devices, and, more specifically, dual bimorph synthetic jet (DBSJ) devices. DBSJ devices are particularly beneficial because such devices have low power requirements, low weight penalties, large control authority (jet strength), good frequency and amplitude range, and compactness, and therefore permit ease of integration with the wind turbine blade system. In other embodiments, the active flow modification device 20 system may be configured to modify the wind flow using methods other than the synthetic jets. For example, other non-zero mass flow actuation devices, such as flip-flop jets and fluidic oscillators that provide pulsed velocity jets, can alternatively or additionally be used.

As shown in FIG. 1, the wind turbine 100 also typically includes a wind turbine generator 30 that converts mechanical energy to electrical energy, a gear mechanism 40 that provides the mechanical energy harnessed from the wind turbine blades to the generator 30, a yaw mechanism 60, an operating condition monitoring device 70, and a blade pitch mechanism 80. A controller 50 is operably coupled to at least the operating condition monitoring device 70, for obtaining a current state of an operating condition of the wind turbine, and to the active flow devices 20 for providing active flow control to the wind turbine while in operation. The controller 50 may further be coupled to the generator 30, the gear mechanism 40, the yaw mechanism 60, and the blade pitch mechanism 80 for controlling the wind turbine operation or for receiving inputs. It is noted that coupling between the controller 50 and the active flow modification devices 20 and pitch mechanism 80 have been shown in the FIG. 1 by the use of connecting lines for illustrative purposes only, and do not necessarily indicate wires, but rather include any suitable means for operably coupling the devices.

In one embodiment, the active flow modification devices 20 provide for active flow modification in the wind flow around the blade by controlling flow separation proximate to the blade and thereby modifying the loading of the wind turbine blades. According to one technique, the active flow modification is configured to promote a flow separation in the wind flow proximate to the blade, thereby deteriorating lift available to the wind turbine. This technique is employed in response to gusty winds and reduces system loads. According to another technique, the active flow modification prevents the flow separation in the wind flow proximate to the blade, by adding unsteady aerodynamic momentum and vorticity to the wind flow proximate to the blade. This leads to enhancement of the lift available to the wind turbine, and therefore generation of more power for a given blade size or same power with a reduced blade size (that is, having lower chord lengths, reduced thicknesses, or combinations thereof). The ability to mitigate system loads effectively permits use of large rotor diameters, while the ability to extract more power from large rotor blades additionally justifies use of such large rotor diameters. These techniques increase the available blade size and the available power from the blade, thereby resulting in an improved rotor blade. These techniques are discussed in more detail below.

As discussed above, one aspect of the invention resides in enabling more power from a given blade size or in enabling a smaller blade to be used to generate the same power as a larger blade (without the active flow modification) would be able to. This is enabled by using active flow modification to enhance the available lift, and by considering the active flow modification enhanced available lift while designing the blade. An enhanced available lift also provides for the same amount of power from a smaller and thinner airfoil. In some embodiments, lift enhancement is the default setting and, in extreme wind conditions (or parked wind turbine), the active flow control may be turned off, thereby mitigating the undesirable loading conditions of the wind turbine.

Another aspect of the invention, as discussed above, resides in enabling a larger blade size (than possible without active flow modification) while designing the wind turbine to still meet operating specifications. A large blade advantageously provides for a higher harvest of wind power available (by enhancing available lift) but can create challenges in extreme wind conditions. In such conditions, active flow modification is used for deteriorating aerodynamic performance by decreasing available lift, thereby reducing the lift experienced by the blade. This reduces the system loads in extreme wind conditions.

Figure 3:
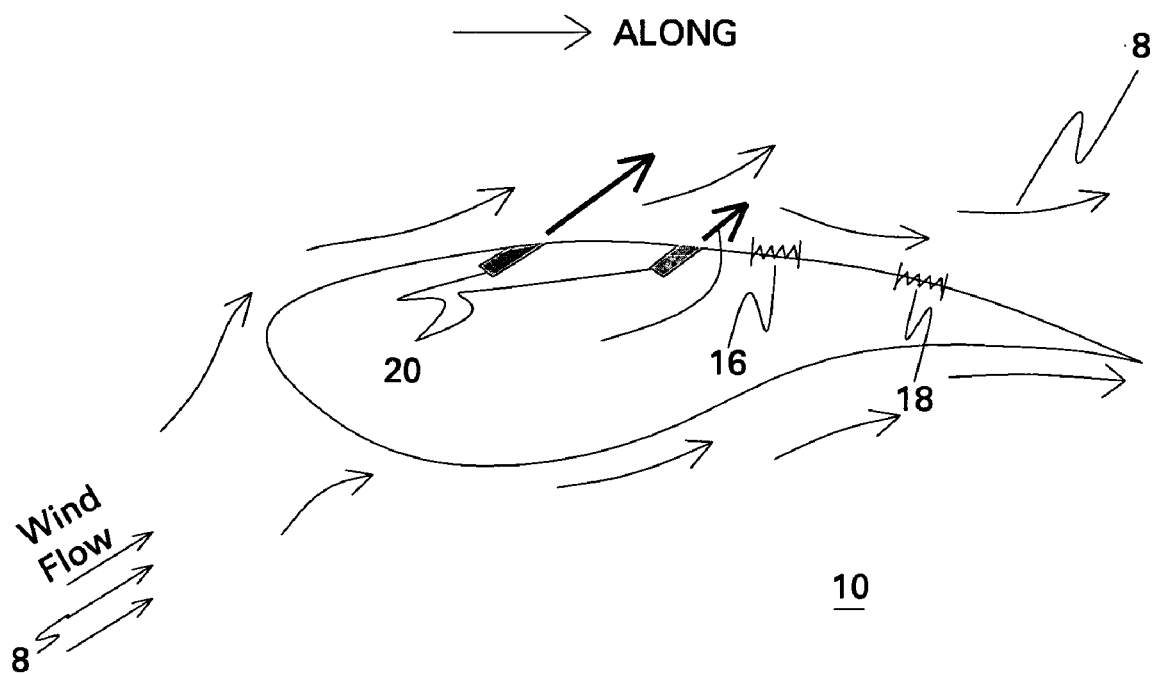
FIG. 3 is a cross sectional view of the blade of FIG. 2 in accordance with one embodiment of the invention.
Figure 4:
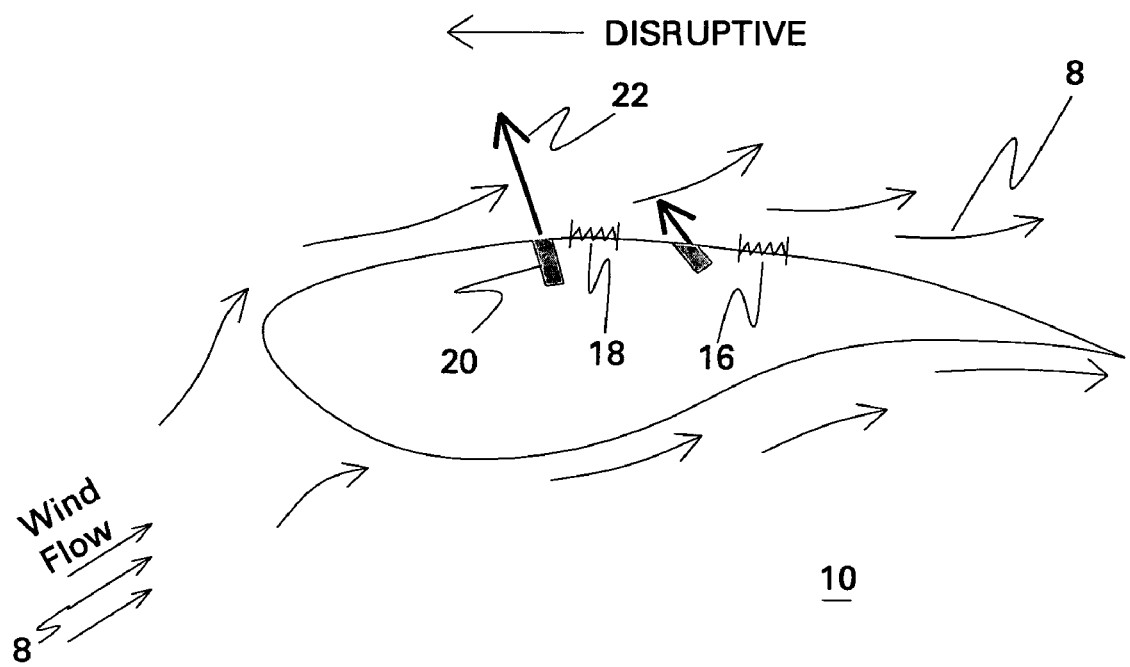
FIG. 4 is a cross sectional view of the blade of FIG. 2 in accordance with another embodiment of the invention.

More specifically, as illustrated by FIGS. 3-4, in several embodiments the active flow modification device 20 is disposed on the side 12 of the blade 10. The active flow modification devices are configured for controlling flow separation by modifying the wind flow proximate to the blade 10.

For example, in the embodiment of FIG. 3, flow separation is inhibited (meaning diminished, delayed, or combinations thereof) by the active flow modification devices. For example purposes in FIG. 3, the flow separation point is represented as being at a position 18 as opposed to at an upstream position 16 where it would naturally result without active flow modification. In one embodiment, the flow separation is inhibited by introducing an unsteady (time dependent) jet flow 22 having a large component of momentum and vorticity substantially along the wind flow proximate to the blade, as also illustrated by the embodiment of FIG. 3. The jet flow 22 in FIG. 3 adds momentum and vorticity in the wind flow proximate to the blade. When vorticity and momentum are added by the active flow modification, the momentum deficit of boundary layers is at least partially replenished, and the flow separation is inhibited and available lift is enhanced. The flow in which separation has been inhibited, as exhibited in FIG. 3, helps in adding lift thereby increasing the performance of the turbine for a given blade size or reducing the blade chord lengths for a given level of performance. The active flow modification devices may add momentum and vorticity at specific angles to an incident wind flow, and such angles may be varied according to the desired performance conditions.

In another example illustrated by FIG. 4, flow separation is promoted by the active flow modification devices. For example purposes in FIG. 4, the flow separation point is represented as being at a position 18 as opposed to at a down stream position 16 where it would naturally result without active flow modification. In the embodiment of FIG. 4, the flow separation is promoted by introducing an unsteady jet flow 22 having a large component of momentum substantially disruptive to the wind flow proximate to the blade. The unsteady jet flow 22 of FIG. 4 initiates flow separation in the wind flow proximate to the blade. The disruptive jet flow 22 may be an oblique jet flow that obstructs the natural wind flow proximate to the blade. The promoted flow separation as exhibited in FIG. 4 results in a decreased lift, and may be advantageously employed to mitigate undesirable loading conditions. Such undesirable conditions include cases of increase in wind flow velocity that leads to a increased loading of the blades (increased lift) and the wind turbine. The embodiments as discussed advantageously provide for artificially decreasing the lift, nearly instantaneously in certain cases, by actively modifying the wind flow proximate to the blade as exhibited in FIG. 4. As discussed, the active flow modification devices may add disruptive momentum at specific angles to an incident wind flow, and such angles may be varied according to the desired performance conditions.

According to another aspect of the invention, active flow modification is advantageously applied for reducing wind turbine losses (and thus increasing aerodynamic efficiency), for reducing the aerodynamic noise generated proximate to the tip 15 of the blade, or for combinations of loss and noise reduction. In an embodiment illustrated by FIG. 5, an active flow modification device 20 is disposed on the tip 15 of the blade 10. According one aspect of to the technique, the active flow modification device is configured for modifying a tip vortex 24 by modifying the wind flow proximate to the blade 10. In the embodiment illustrated by FIG. 5, the tip vortex 24 is modified by introducing an unsteady jet flow 23 that causes the tip vortex 24 (dashed line) to be displaced to another location as illustrated by tip vortex 26. In other cases the added jet flow may be used to affect the initiation and development of the tip vortices or modify the evolution and trajectory of the tip vortex 24. In general, the jets 23 modify the flow structure near the tip, and result in a quick dissipation of the vortex, or a displacement of the tip vortex 24 away from the tip, or a reduction in the strength of the tip-vortex being formed.

Another significant aspect of the invention is that these active flow modification devices 20 may be disposed in either retrofit of existing blade embodiments or be used to come up with new blade embodiments. For new blade embodiments, the capability to control the separation and hence the loading levels of the blade imply that newer and more radical, or at least a larger variety of airfoil and blade shapes, beyond those that comprise the state-of-the art in wind turbine airfoil/blade design may now be used in wind turbine blades. Such new designs may be optimized to provide higher aerodynamic performance (lift and lift-to-drag ratios, for examples) and efficiency than those presently used.

The strategies, as discussed, are among the ones that the controller 50 may employ for actively modifying the wind flow 8 proximate to the blade. The controller 50 is configured to receive a current state of operating conditions of the wind turbine 100, and in response to the current state of the operating conditions, actively modify the wind flow 8 proximate to the blade. The operating conditions include, without limitation, wind environmental conditions, for example, wind flow velocity and wind flow direction. In certain embodiments, operating conditions further include turbine rotation speed, pitch angle of the blades, and yaw angle of the wind turbine.

In one embodiment, the controller 50 is configured provide active flow instructions to at least one active flow modification device 20 in response to the current state of at least one operating condition. In an aspect, upon the occurrence of a sudden increase of incident wind velocity or a change in wind direction that significantly increases the lift to undesirable levels, the controller 50 activates the active flow modification devices 20 configured to release disruptive unsteady jet flows, as shown in FIG. 4. In another aspect, the controller maintains the active flow modification devices in an activated state and turns them off upon detecting a change in incident wind velocity or direction that might increase system loads to undesirable levels.

Figure 5:
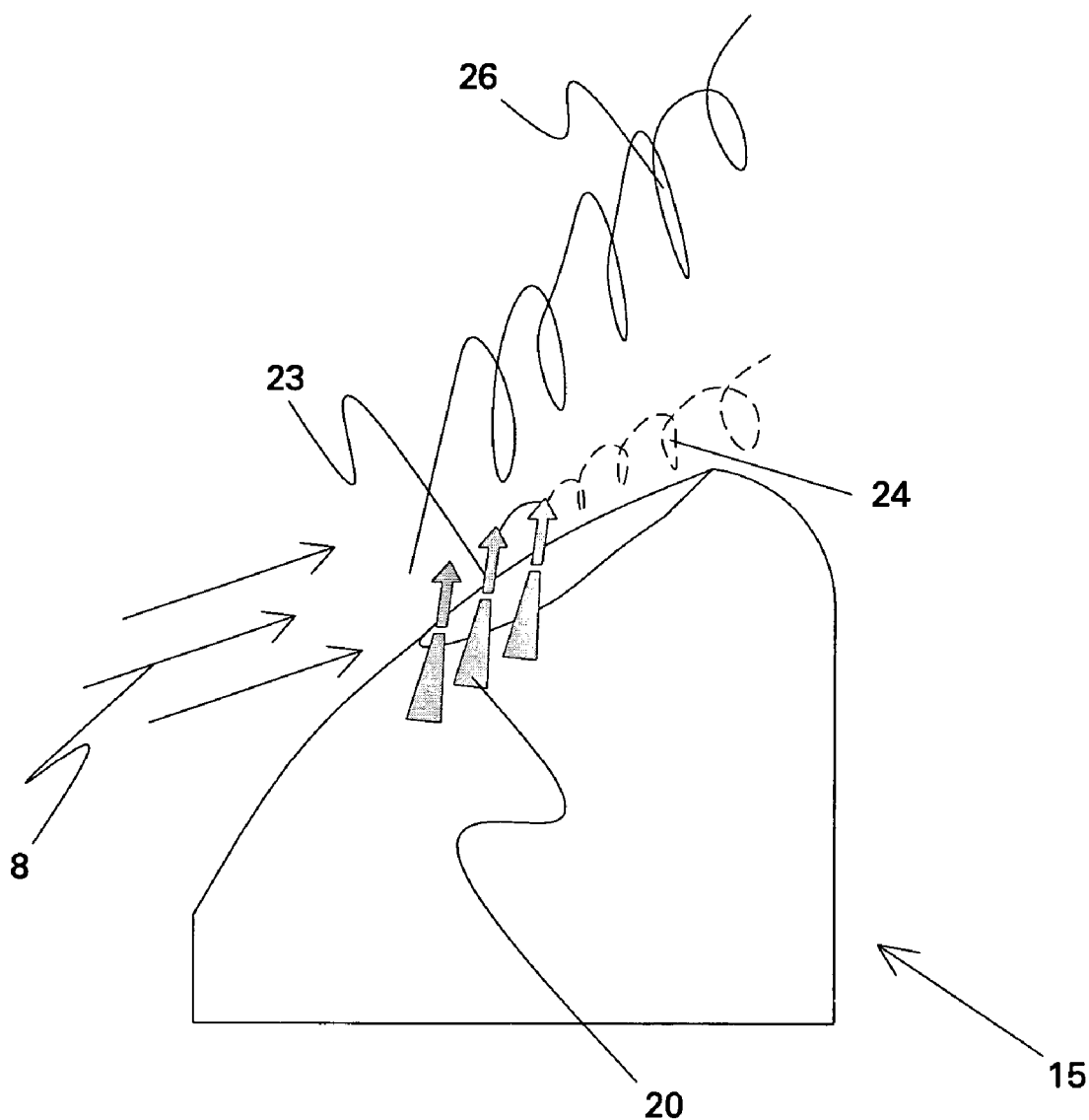
FIG. 5 is a partial perspective view of the blade of FIG. 2 in accordance with another embodiment of the invention.

According to another aspect, conditions in which the lift available may be low due to low wind flow speeds or unfavorable wind flow direction, and consequently the power generated is low, the controller 50 activates the active flow modification devices configured to release an unsteady jet flow that enhances the lift by inhibiting flow separation, as illustrated in FIG. 3. According to another aspect, the controller 50 activates the active flow modification devices proximate to the tip of the blade, dissipating the tip vortex or displacing the tip vortex away from the tip, as illustrated by FIG. 5.

Appropriate response strategies, by using active flow instructions, in response to various operating conditions will be apparent to those skilled in the art, and such apparent strategies are embodied in the scope and spirit of the present invention. For example, within the embodiment wherein the active flow modification devices comprise synthetic jets, various response strategies include without limitation, modifying a velocity of the synthetic jets 22 or 23, modifying a frequency of introducing the synthetic jets 22 or 23, a location of the synthetic jet 22 on the side 12, a location of the synthetic jet 23 on the tip 15, an angle of the synthetic jets 22 or 23 (meaning either the entire jet, holes of the jet, or combinations thereof), a size of the synthetic jet exits (holes or slots), a shape of the synthetic jet exits (holes or slots), and combinations thereof. The various response strategies may be realized by, for example, disposing multiple active flow modification devices 20, of different exit sizes and shapes, in differing orientations or locations, and selectively activating the active flow modification devices.

In one embodiment, the controller 50 is further configured to receive a current state of the gear and generator functions, and is configured to provide active flow instructions in response to these conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine comprising:
   a wind turbine blade situated on the wind turbine and being configured to rotate about an axis upon an impact of a wind flow on the blade;
   a plurality of active flow modification devices comprising a plurality of synthetic jets disposed on the blade at a plurality of locations, the active flow modification devices configured to receive active flow instructions and introduce a jet flow to modify the wind flow proximate to the blade; and
   a controller configured for providing the active flow instructions to the active flow modification devices based on a response strategy to modify the jet flow introduced by the active flow modification devices,
   wherein the response strategy is selected from the group consisting of modifying a velocity of the synthetic jet, modifying a frequency of the synthetic jet, selectively activating the synthetic jet based on the location of the synthetic jet on the blade, an angle of the synthetic jet, a size of the synthetic jet exit, a shape of the synthetic jet exit, and combinations thereof.

2. The wind turbine of claim 1, wherein the active flow modification device is configured for modifying a load on the wind turbine by reducing the load on the wind turbine.

3. The wind turbine of claim 1, wherein the active flow modification device is disposed on the side, and wherein the active flow modification device is configured for modifying flow separation.

4. The wind turbine of claim 3, wherein the active flow modification device is configured for inhibiting flow separation by introducing an unsteady jet flow with a large component of momentum and vorticity substantially along the wind flow proximate to the blade.

5. The wind turbine of claim 3, wherein the active flow modification device is configured for promoting flow separation by introducing an unsteady jet flow with a large component of momentum substantially disruptive to the wind flow proximate to the blade.

6. The wind turbine blade of claim 1, wherein the at least one active flow modification device comprises a dual bimorph synthetic jet device.

7. A wind turbine comprising:
   a wind turbine blade situated on the wind turbine comprising a side and a tip, the blade being configured to rotate about an axis upon an impact of a wind flow on the blade; and
   an active flow modification device disposed on the blade, the active flow modification device configured to receive active flow instructions and introduce a jet flow to modify the wind flow proximate to the blade,
   wherein the active flow modification device is disposed on the tip, and wherein the active flow modification device is configured for modifying a tip vortex.

8. The wind turbine of claim 7, wherein the active flow modification device is configured for modifying the tip vortex by weakening, destroying, displacing, or combinations thereof.

9. The wind turbine of claim 7, wherein the active flow modification device is configured to introduce an unsteady jet flow in the wind flow proximate to the tip.

10. The wind turbine of claim 7, wherein the active flow modification device introduces an unsteady jet flow in the wind flow proximate to the tip, and further comprising a controller configured for providing the active flow instructions to the active flow modification device to modify a characteristic of the introduced jet flow, wherein the active flow modification device comprises a synthetic jet, and wherein the characteristic is gone of a velocity of the synthetic jet and a frequency of the synthetic jet, an angle of the synthetic jet, a size of the synthetic jet exit, a shape of the synthetic jet exit, and combinations thereof.

11. The wind turbine blade of claim 7, wherein the at least one active flow modification device comprises a dual bimorph synthetic jet device.

12. A method of operating a wind turbine comprising a blade rotatable about an axis upon an impact of a wind flow on the blade, the method comprising:
   obtaining a current state of at least one operating condition of the wind turbine; and
   actively modifying the wind flow proximate to the blade in response to the current state of the at least one operating condition,
   wherein said actively modifying the wind flow comprises using a dual bimorph synthetic jet device, and
   wherein the at least one operating condition is selected from the group consisting of a wind flow velocity, a wind flow direction, a turbine rotation speed, a pitch angle, a yaw angle and combinations thereof.

13. The method of claim 12, wherein said actively modifying the wind flow is performed in a manner to reduce a load on the wind turbine.

14. The method of claim 12, wherein said actively modifying the wind flow comprises modifying a flow separation in the wind flow proximate to the blade.

15. The method of claim 12, wherein said actively modifying the wind flow comprises inhibiting a flow separation in the wind flow proximate to the blade by introducing an unsteady jet flow having a large component of momentum and vorticity substantially along the wind flow proximate to the blade.

16. The method of claim 15, wherein said inhibiting the flow separation occurs in response to a lower than desired level of wind lift to the wind turbine.

17. The method of claim 12, wherein said actively modifying the wind flow comprises initiating a flow separation in the wind flow proximate to the blade by introducing an unsteady jet flow having a large component of momentum substantially disruptive to the wind flow proximate to the blade.

18. The method of claim 17, wherein said initiating a flow separation occurs in response to a higher than desired level of wind lift generated by the wind flow.

19. A method of operating a wind turbine comprising a blade rotatable about an axis upon an impact of a wind flow on the blade, the method comprising:

obtaining a current state of at least one operating condition of the wind turbine; and actively modifying the wind flow proximate to the blade in response to the current state of the at least one operating condition, wherein said actively modifying the wind flow comprises using a dual bimorph synthetic jet device, and wherein said actively modifying comprises attenuating an aerodynamic noise generated proximate to a tip of the blade by introducing a jet flow proximate to the tip.

20. The method of claim 19, wherein said introducing the jet flow modifies a tip vortex.

21. A wind turbine blade assembly comprising:

a wind turbine blade comprising a side and a tip, the blade being configured to rotate about an axis upon an impact of a wind flow on the blade; and a plurality of active flow modification devices disposed on the blade at a plurality of locations, the active flow modification device configured to receive active flow instructions and introduce a jet flow to modify the wind flow proximate to the blade; and a controller configured for providing the active flow instructions to the active flow modification device based on a response strategy to modify the jet flow introduced by the active flow modification device.

22. The wind turbine blade assembly of claim 21, wherein the active flow modification device is configured for modifying a load on the wind turbine.

23. The wind turbine blade assembly of claim 21, wherein the active flow modification device is disposed on the side, and wherein the active flow modification device is configured for modifying a flow separation of the wind flow proximate to the blade.

24. The wind turbine blade assembly of claim 23, wherein the active flow modification device is configured to introduce an unsteady jet flow with a large component of momentum and vorticity substantially along the wind flow proximate to the blade.

25. The wind turbine blade assembly of claim 23, wherein the active flow modification device is configured to introduce an unsteady jet flow with a large component of momentum substantially disruptive to the wind flow proximate to the blade.

26. The wind turbine blade assembly of claim 21, wherein the active flow modification device is disposed on the tip, and the active flow modification device is configured for modifying a tip vortex.

27. The wind turbine blade of claim 21, wherein the at least one active flow modification device comprises a dual bimorph synthetic jet device.

28. The wind turbine blade of claim 21, wherein the response strategy is selected from the group consisting of modifying a velocity of the synthetic jet, modifying a frequency of the synthetic jet, selectively activating the synthetic jet based on a location of the synthetic jet on the blade, an angle of the synthetic jet, a size of the synthetic jet exit, a shape of the synthetic jet exit, and combinations thereof.

29. A wind turbine blade comprising at least one active flow modification device disposed on the blade, the at least one active flow modification device receiving active flow instructions from a controller based on an operating condition of the wind turbine blade, and introducing in a time-dependent fashion, jets of selected strengths and selected frequencies proximate to the wind turbine blade to control flow separation proximate to the wind turbine blade based on a response strategy to modify the jet flow introduced by the at least one active flow modification device, wherein the operating condition is selected from the group consisting of a wind flow velocity, a wind flow direction, a turbine rotation speed, a pitch angle, a yaw angle and combinations thereof, thereby modifying a loading of the wind turbine blade.

30. The wind turbine blade of claim 29, wherein the at least one active flow modification device comprises a dual bimorph synthetic jet device.

31. The wind turbine blade of claim 29, wherein the at least one active flow modification device comprises a dual bimorph synthetic jet device.

32. The wind turbine blade of claim 29, wherein the response strategy is selected from the group consisting of modifying a velocity of the synthetic jet, modifying a frequency of the synthetic jet, selectively activating the synthetic jet based on a location of the synthetic jet on the blade, an angle of the synthetic jet, a size of the synthetic jet exit, a shape of the synthetic jet exit, and combinations thereof.

* * * * *

UNITED STATES PATENT AND TRADEMARK OFFICE
CERTIFICATE OF CORRECTION

PATENT NO.       : 7,387,491 B2                                            Page 1 of 1
APPLICATION NO.  : 11/022900
DATED            : June 17, 2008
INVENTOR(S)      : Saddoughi et al.

It is certified that error appears in the above-identified patent and that said Letters Patent is hereby corrected as shown below:

In Column 8, Line 22, in Claim 10, delete "gone" and insert -- one --, therefor.

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,387,491 B2 | Page 1 of 1 |
| APPLICATION NO. | : 11/022900 | |
| DATED | : June 17, 2008 | |
| INVENTOR(S) | : Saddoughi et al. | |

It is certified that error appears in the above-identified patent and that said Letters Patent is hereby corrected as shown below:

In the Claims:

In Column 7, Line 60, in Claim 6, delete "blade".

In Column 10, Line 5, in Claim 27, after "blade" insert -- assembly --.

In Column 10, Line 8, in Claim 28, after "blade" insert -- assembly --.

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 7,387,491 B2 |
| APPLICATION NO. | : 11/022900 |
| DATED | : June 17, 2008 |
| INVENTOR(S) | : Saddoughi et al. |

It is certified that error appears in the above-identified patent and that said Letters Patent is hereby corrected as shown below:

In the Claims

Col. 7, line 44 (Claim 2), delete "device is" and
substitute therefore -- devices are --.

Col. 7, line 47 (Claim 3), delete "device is disposed on the side," and
substitute therefore -- devices are disposed on a side of the blade, --.

Col. 7, line 48 (Claim 3), delete "device is" and
substitute therefore -- devices are --.

Col. 7, line 51 (Claim 4), delete "device is" and
substitute therefore -- devices are --.

Col. 7, line 56 (Claim 5), delete "device is" and
substitute therefore -- devices are --.

Col. 7, line 60 (Claim 6), delete "the at least" and
substitute therefore -- at least --.

Col. 9, line 22 (Claim 21), delete "modification device" and
substitute therefore -- modification devices --.

Col. 9, line 26 (Claim 21), delete "modification device" and
substitute therefore -- modification devices --.

Col. 9, line 30 (Claim 22), delete "device is" and
substitute therefore -- devices are --.

Signed and Sealed this
Twenty-third Day of December, 2014

Michelle K. Lee
*Deputy Director of the United States Patent and Trademark Office*

CERTIFICATE OF CORRECTION (continued)
U.S. Pat. No. 7,387,491 B2

Col. 9, line 33 (Claim 23), delete "the active flow" and
                               substitute therefore -- an active flow --.

Col. 10, line 2 (Claim 26), delete "the active flow" and
                               substitute therefore -- "an active flow --.

Col. 10, line 5 (Claim 27), delete "the at" and
                               substitute therefore -- at --.